United States Patent [19]
Maurio

[11] Patent Number: 6,141,228
[45] Date of Patent: Oct. 31, 2000

[54] PARALLEL RESONANT DC LINKED INVERTER ARRANGEMENT AND METHOD UTILIZING ANTIFERROELECTRIC DIELECTRIC MATERIAL

[75] Inventor: Joseph M. Maurio, Waterford, Conn.

[73] Assignee: Electric Boat Corporation, Groton, Conn.

[21] Appl. No.: 09/323,801

[22] Filed: Jun. 2, 1999

[51] Int. Cl.[7] .................................................. H02H 7/122
[52] U.S. Cl. ............................................. 363/56; 363/131
[58] Field of Search ............................... 363/35, 34, 560, 363/131

[56] References Cited

U.S. PATENT DOCUMENTS

| | | |
|---|---|---|
| 3,255,400 | 6/1966 | Morgan . |
| 4,360,762 | 11/1982 | Yamamoto et al. . |
| 4,855,888 | 8/1989 | Henze et al. . |
| 4,992,919 | 2/1991 | Lee et al. . |
| 5,001,621 | 3/1991 | Egawa . |
| 5,280,421 | 1/1994 | De Doncker et al. . |
| 5,351,181 | 9/1994 | Brennen et al. . |
| 5,355,295 | 10/1994 | Brennen . |
| 5,386,359 | 1/1995 | Nochi ........................................ 323/21 |
| 5,604,422 | 2/1997 | Peters . |
| 5,615,096 | 3/1997 | Stengel et al. ............................ 363/60 |
| 5,719,759 | 2/1998 | Wagner et al. . |
| 5,721,194 | 2/1998 | Yandrofski et al. . |
| 5,729,450 | 3/1998 | Dimino et al. . |
| 5,760,495 | 6/1998 | Mekanik . |
| 5,835,371 | 11/1998 | Kume et al. . |
| 5,841,644 | 11/1998 | Lipo et al. . |

*Primary Examiner*—Shawn Riley
*Attorney, Agent, or Firm*—BakerBotts, LLP

[57] ABSTRACT

In the parallel resonant DC link inverter described in the specification, a DC voltage is applied to a plurality of semiconductor switches to provide an AC driving voltage for an AC motor by way of an LC tank circuit containing a nonlinear capacitance device having an antiferroelectric material as its dielectric. As a result of the increase in capacitance with increased voltage, the voltage peak of the link voltages produced by the circuit is reduced without a corresponding reduction in the volt-second product applied to the motor load.

5 Claims, 6 Drawing Sheets

PARALLEL RESONANT DC LINKED INVERTER ARRANGEMENT AND METHOD UTILIZING ANTIFERROELECTRIC DIELECTRIC MATERIAL

BACKGROUND OF THE INVENTION

This invention relates to DC link inverter arrangements containing, for example semiconductor switches which are turned on and off To maximize the volt-second product applied to a motor load in a pulsed DC power inverter motor drive, a square pulse should be provided. A square-pulse provides the maximum volt-second area producing the highest amount of work done per ampere of supplied current or of the quantity of flux produced in the motor. When semiconductor switches are turned on and off rapidly in an inverter motor drive, square pulses are produced which place large voltage stresses on the switches. When the switches are turned off they must undergo a transition from carrying the full DC load current to blocking the full DC source voltage. Because most high-power devices such as thyristors, bipolar junction transistors, insulated gate bipolar transistors and the like have significant stored charge which must be removed before the device can be turned off completely, the forward current does not drop to zero immediately. Consequently, both a voltage across the device and a current through the device are present during the transition, which leads to power dissipation in the device. This power dissipation produces heat and places a thermal limit on the frequency at which the inverter may operate in addition to reducing the overall efficiency of the inverter. Furthermore, the steep edges of the voltage pulses can lead to significant electromagnetic interference with other equipment.

In so called soft-switching inverters, switch transitions occur under zero voltage or zero current conditions so that little or no power is dissipated. The opportunity to switch at zero voltage or zero current is typically provided by the addition of one or more inductor-capacitor (LC) tanks to the circuit. The resonant dynamics of these additional components can be controlled to insure that the trajectories of the voltages or currents go to zero and the sinusoidal current output of such circuits can be controlled by using either pulse width modulation or pulse density modulation techniques, but additional circuitry is required for the use of pulse width modulation because of the fixed width of the resonant pulse.

A basic resonant link inverter suffers from two fundamental problems. It produces a peak voltage which is two or more times the DC supply voltage, thereby requiring switches with voltage ratings of twice the DC supply voltage and it provides a reduced bus voltage volt-second product area. The first difficulty is particularly important when using power MOSFETs for the controlled switch because the channel resistance of these devices varies approximately with $V_{rated}^{2.5}$ where $V_{rated}$ is the rated forward blocking voltage of the device. This increased resistance leads to greater conduction losses in the switching device. For minority carrier devices, the dependence of the saturation voltage on the forward voltage blocking rating is not as great, typically varying only linearly rather than exponentially with $V_{rated}$. Nevertheless, some higher level of undesirable conduction losses must be accepted in order to accommodate the high peak voltage.

The problem of reduced volt-second area is also a matter of concern. Ideally, to transfer maximum energy for a fixed operating frequency and supply voltage $V_S$, an inverter should supply full voltage for one switching period and then instantaneously switch to zero, thereby providing a rectangular voltage pulse having maximum volt-second area. For the same pulse period and peak voltage value, the volt-second area of the resonant voltage pulse from a tank circuit is lower than that of a rectangular pulse because of the inherent shape of the resonant voltage.

The Lee et. al. Pat. No. 4,992,919 discloses a parallel resonant converter for zero voltage switching including a tank circuit with a varactor diode providing a capacitance which is variable with increasing applied voltage. In this circuit, the variable capacitor is selected so that the output voltage of the converter can remain at its rated value of the zero voltage switching condition.

The Mekanik et. al. Pat. No. 5,760,495 discloses an inverter circuit for an uninterruptable power supply including a ferroresonant capacitor connected across the terminals for transformer circuitry for providing output which is linearly related to the input to the primary winding of the winding of the transformer.

A variable voltage capacitor is disclosed in the Yandrofski et al. Pat. No. 5,721,194 which describes various applications of capacitors incorporating ferroelectric films and the Yamamoto et al. Pat. No. 4,360,762 discloses a non-linear capacitor in a resonant circuit for the purpose of shaping a switching pulse in a starter switch for a fluorescent lamp.

SUMMARY OF THE INVENTION

Accordingly, it is an object of the present invention to provide a parallel resonant DC link inverter arrangement and method which overcomes disadvantages of the prior art.

Another object of the invention is to provide a parallel resonant DC link inverter arrangement having a high volt-second product per resonant voltage pulse and reduced voltage stresses imposed on power electronic switches.

These and other objects of the invention are attained by providing a parallel resonant DC link inverter having a voltage-variable resonant capacitor arranged to reduce peak resonant linked voltage so as to maximize the energy transferred by the inverter without requiring excessive switch voltage ratings. In a particular embodiment, the parallel resonant DC link inverter motor drive includes an LC tank circuit to control switching transitions at zero voltage conditions so that little or no power is dissipated by the motor drive transistors and the capacitor in the tank circuit is a voltage-variable resonant capacitor made of an antiferroelectric material providing increased capacitance with increasing terminal voltage as a result of a state change within the dielectric material in a high electric field. The effect of the non-linear capacitor is to reduce the peak voltage required to generate an acceptable volt-second product of the link voltage wave form which is applied to the switching transistor. In this way maximum energy is transferred at a fixed operating frequency without causing voltage stress which is normally incurred by high peak link voltage levels.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
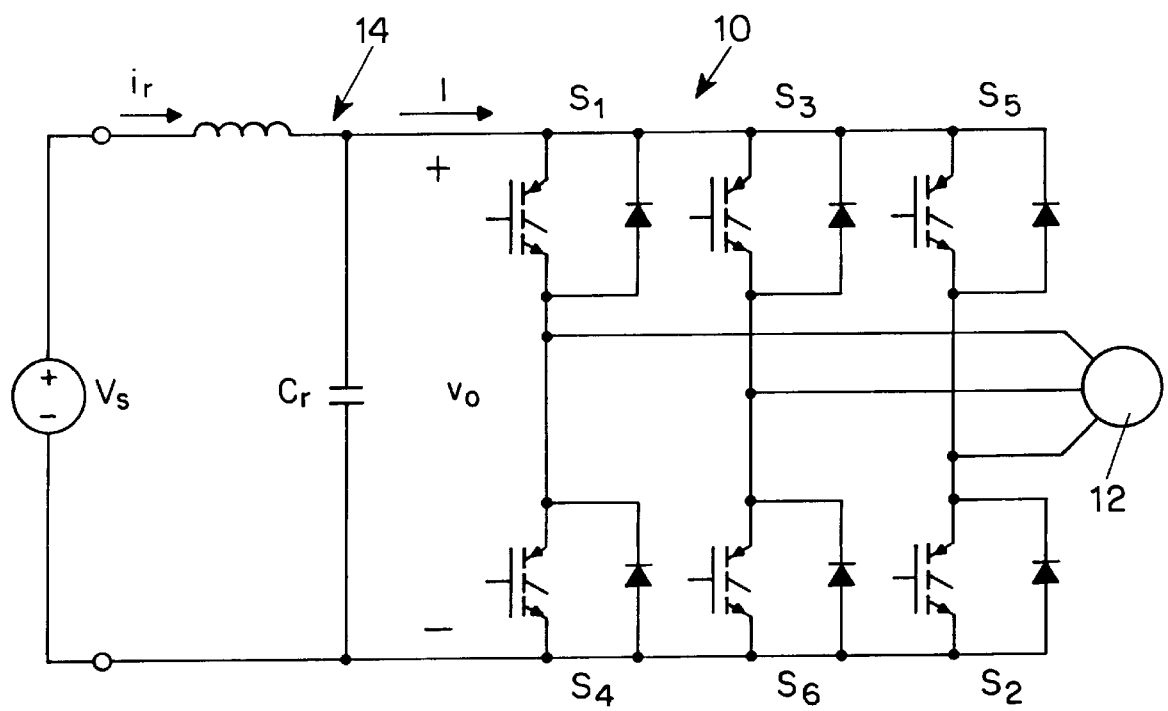
FIG. 1 is a schematic circuit diagram illustrating a representative conventional parallel resonant DC link circuit.

A common type of soft-switch inverter is the parallel resonant DC link inverter (PRDCLI). A typical PRDCLI 10 supplying three phase power to an AC motor 12 is shown in FIG. 1. For this arrangement, the differential equations describing the current voltage waveforms in the resonant tank circuit 14 of the inverter are:

$$\frac{di_{Lr}}{dt} = \frac{1}{L_r}(V_s - i_{Lr}R_r - v_{Cr}) \quad (1)$$

and $$\frac{dv_{Cr}}{dt} = \frac{1}{C_r}(i_{Lr} - I_L), \quad (2)$$

where $i_{Lr}$ is the current in the resonant inductor $L_r$, $V_S$ is the DC source voltage, $V_{Cr}$ is the voltage in the resonant capacitor $C_r$ and $I_L$ is the load current.

The operation of this inverter is straightforward. Initially, both a high-side and low-side switch in the same leg, $S_1$ and $S_4$ for example, are turned on simultaneously. At this time, the voltage across capacitor $C_r$, referred to as the link voltage, is zero, allowing lossless turn-on and turn-off of all other switches. The current through the inductor $L_r$ rises linearly with an approximate slope of $V_S/L_r$, until a certain prescribed current $(I_O+I_L)$ is reached. This value corresponds to the value of the load current $I_L$ added to the minimum current $I_O$ needed to overcome the parasitic losses of the components in the LC tank and represents the initial value for the resonant cycle. This current initialization ensures that the bus voltage will return to zero at the end of the resonant cycle. At the instant the current $I_O+I_L$ is attained, one of the two switches ($S_1$ and $S_4$) is switched off according to the state it would assume in the particular inverter application. The natural response of the LC tank then leads to the transfer of energy from the inductor $L_r$ to the capacitor $C_r$ and back again. At the end of one such resonant cycle, the capacitor energy and hence voltage reach zero and the above process is repeated. It is important to note here that the parallel resonant tank capacitor is only partially involved in the energy transfer from the source to the load. The inductor should be designed with minimal parasitic resistance.

Figure 2:
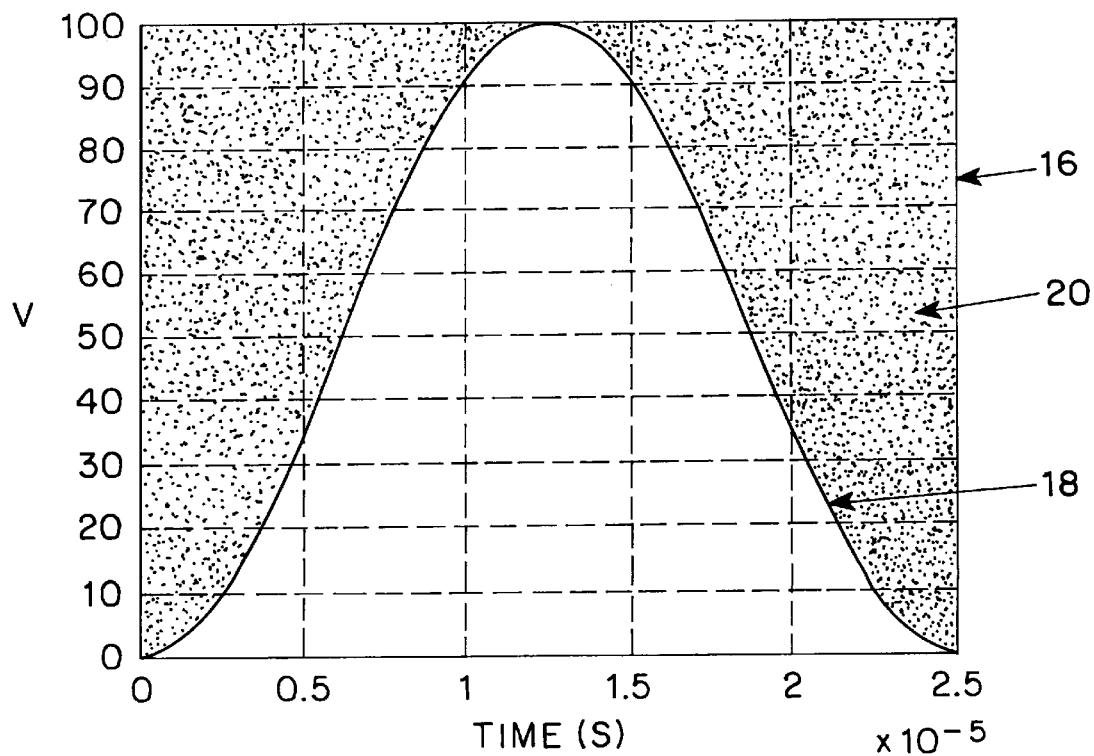
FIG. 2 is a graphical illustration of voltage versus time comparing the volt-second areas of square wave and resonant voltage pulses.

To transfer the maximum energy for a fixed operating frequency and supply voltage $V_S$, an inverter would have to supply full voltage for one switching period and then instantaneously switch to zero, thereby producing a rectangular voltage pulse 16, shown in FIG. 2, having maximum volt-second area. For the same pulse period and peak voltage value, the volt-second area of a resonant voltage pulse 18, shown in FIG. 2, is lower than that of the rectangular pulse. This is due to the inherent shape of the resonant voltage. The shaded area 20 in FIG. 2 illustrates the difference between the volt-second area of the rectangular pulse and that of the resonant pulse. To provide the same energy transfer as a rectangular pulse having a given volt-second area and fixed pulse period, it is apparent that the resonant voltage must have a higher peak value.

Figure 3:
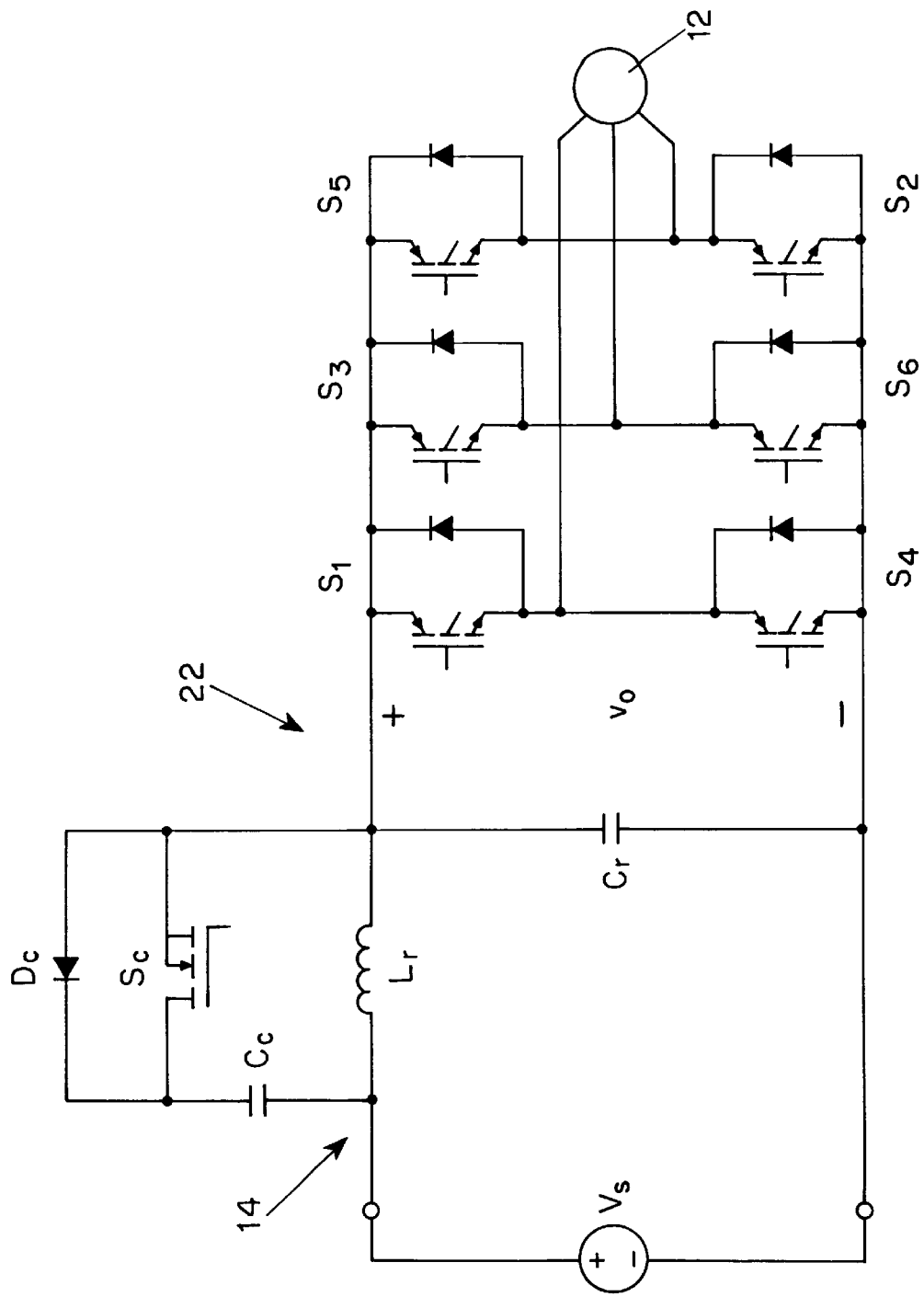
FIG. 3 is a schematic circuit diagram illustrating a representative conventional actively clamped parallel resonant DC link inverter.

A conventional actively-clamped parallel resonant DC link inverter 22, schematically shown in FIG. 3, attempts to alleviate the high peak voltages by introducing an additional clamp capacitance $C_C$ as the link voltage magnitude increases. When the link voltage becomes slightly higher than the DC source voltage, $V_S$, a diode DC is forward-biased and a switch $S_C$ is turned on, causing a capacitor $C_C$ to be introduced into the resonant circuit. This causes the link voltage pulses to flatten out. When the voltage decreases to $V_S$, the switch $S_C$ is turned off and the link voltage resonates back to zero along its original trajectory. There are several disadvantages to this arrangement however. Additional components, $S_C$, $C_C$ and $D_C$ are required as well as the added circuitry for the control of the switch $S_C$. Additionally, there are increased switching losses due to the additional switch $S_C$. Although not as severe as a "hard-switched" inverter, there are large dv/dt's present on the link voltage as the clamp capacitor is switched in and out of the circuit.

Figure 4:
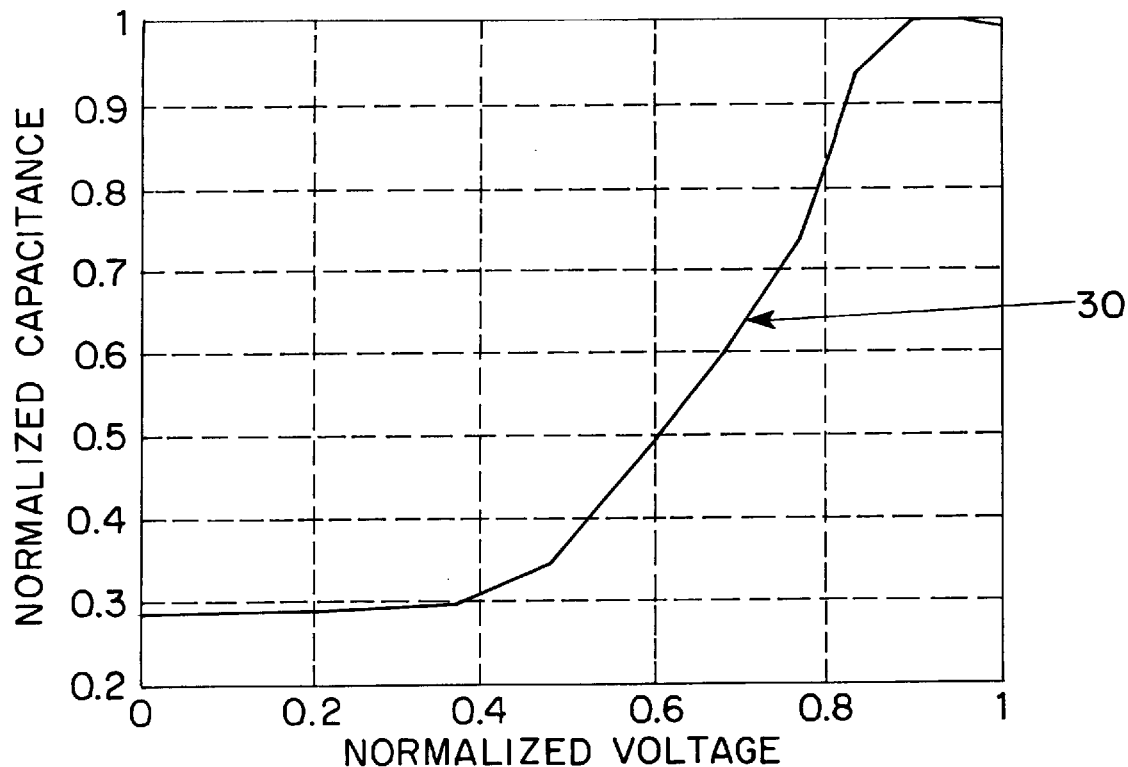
FIG. 4 is a graphical illustration showing a normalized capacitance versus voltage relationship for a voltage-variable resonant capacitor having an antiferroelectric dielectric material.
Figure 8:
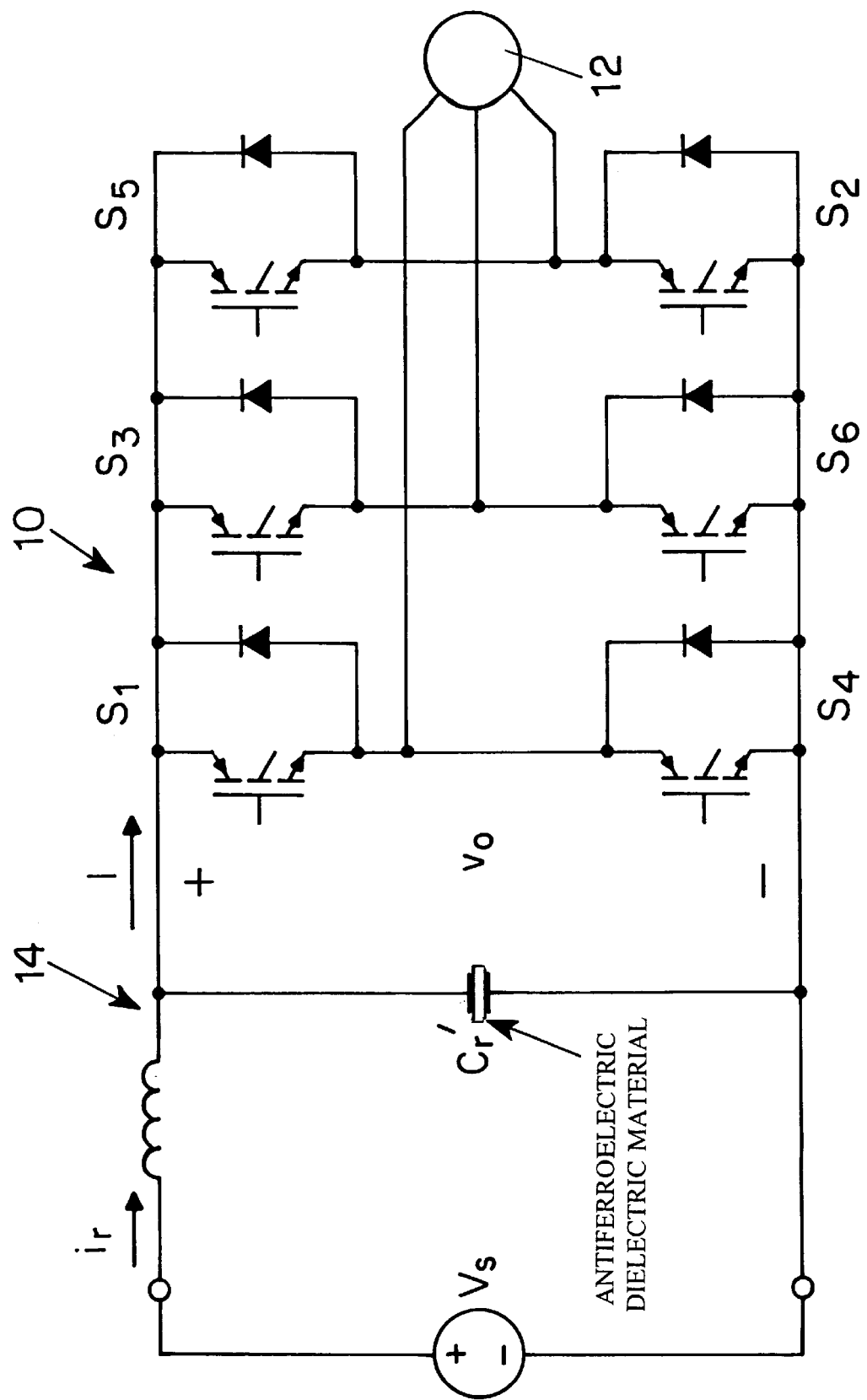
FIG. 8 is a schematic circuit diagram illustrating a representative parallel resonant DC link circuit having a capacitor with an antiferroelectric dielectric material in accordance with the invention.

In accordance with the invention, these problems are overcome by providing a resonant circuit as shown in FIG. 8 which includes a voltage-variable resonant capacitor $C_r'$. A voltage-variable capacitor is a two terminal capacitance device that has an antiferroelectric material such as $PbZrO_3$ as its dielectric. The device is constructed so that its capacitance increases with increasing terminal voltage. This is due to a state change occurring within the dielectric material under high impressed electric fields. The exact relationship can be tailored by those skilled in the art to produce a nearly linear or square relationship. The voltage-variable capacitor used in the preferred embodiment has a capacitance versus applied voltage characteristic illustrated graphically by the curve 30 in FIG. 4.

Figure 5:
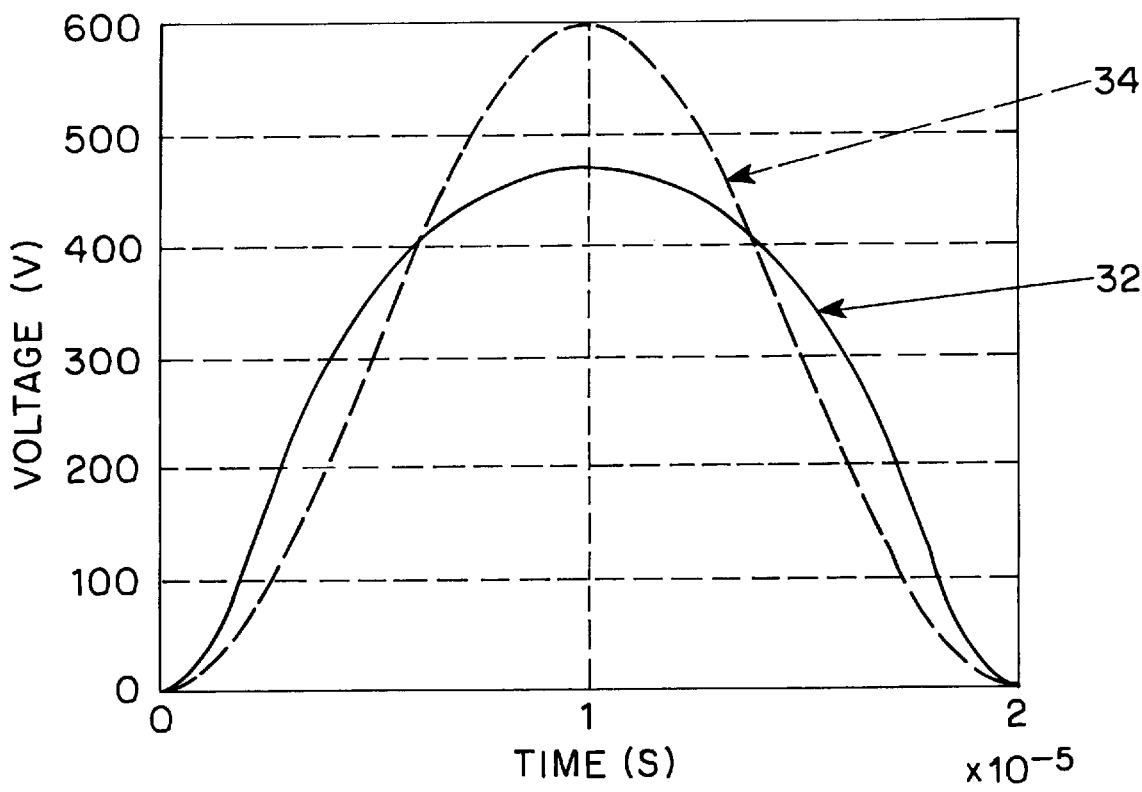
FIG. 5 is a graphical illustration of voltage versus time showing a comparison of the link voltages of a standard resonant tank circuit and the resonant tank circuit of the invention.

Substitution of a nonlinear capacitor for the resonant capacitor in the conventional circuit of FIG. 1 reduces the peak of the link voltage waveform. To demonstrate this effect, the resonant tank circuit of the invention was simulated using Matlab v4.2c. FIG. 5 shows a comparison of the link voltage pulse 32 of the circuit of the invention and the standard resonant tank circuit pulse 34. A nonlinear voltage-variable capacitor scaled to produce the same frequency pulses as the standard resonant converter was used. Table 1 shows the component values used for the simulations.

FIG. 5 shows that the resonant converter link voltage peaks at twice the DC rail $V_S$ whereas the converter link voltage of the invention peaks at 1.56 $V_S$. The voltage peak can be reduced further by appropriate tailoring of the capacitance versus voltage characteristics of the voltage variable capacitance device.

TABLE 1

Component Values of Resonant Tank Circuits Used for Simulations

| Standard Resonant Tank Circuit | Value |
|---|---|
| $L_r$ | 29.0 $\mu$H |
| $C_r$ | 0.35 $\mu$F |
| Resonant Tank Circuit with Voltage Variable Capacitor | |
| $L_r$ | 52.5 $\mu$H |
| $C_r'$ | 0.1 $\mu$F nominal (.35 $\mu$F peak) |

To utilize the tank circuit arrangement of the invention, it is necessary to provide design equations that will enable the designer to create a resonant inverter circuit that operates at a desired frequency. Solving equation (2) above using linear circuit analysis for the standard resonant link inverter tank circuit we find that $$v_{C_r} = V_S \left(1 - \cos\left(\frac{t}{\sqrt{L_r C_r}}\right)\right). \tag{3}$$

The resonant frequency is given by the familiar relationship $$f_r = \frac{1}{2\pi\sqrt{L_r C_r}}. \tag{4}$$

For the tank circuit of the invention, linear analysis techniques cannot be applied because the capacitance of the voltage-variable capacitor is a function of one of the states of the system making the system non-linear. However, the resonant frequency versus capacitance can be determined numerically and a closed form solution for this relationship may be provided.

Figure 6A:
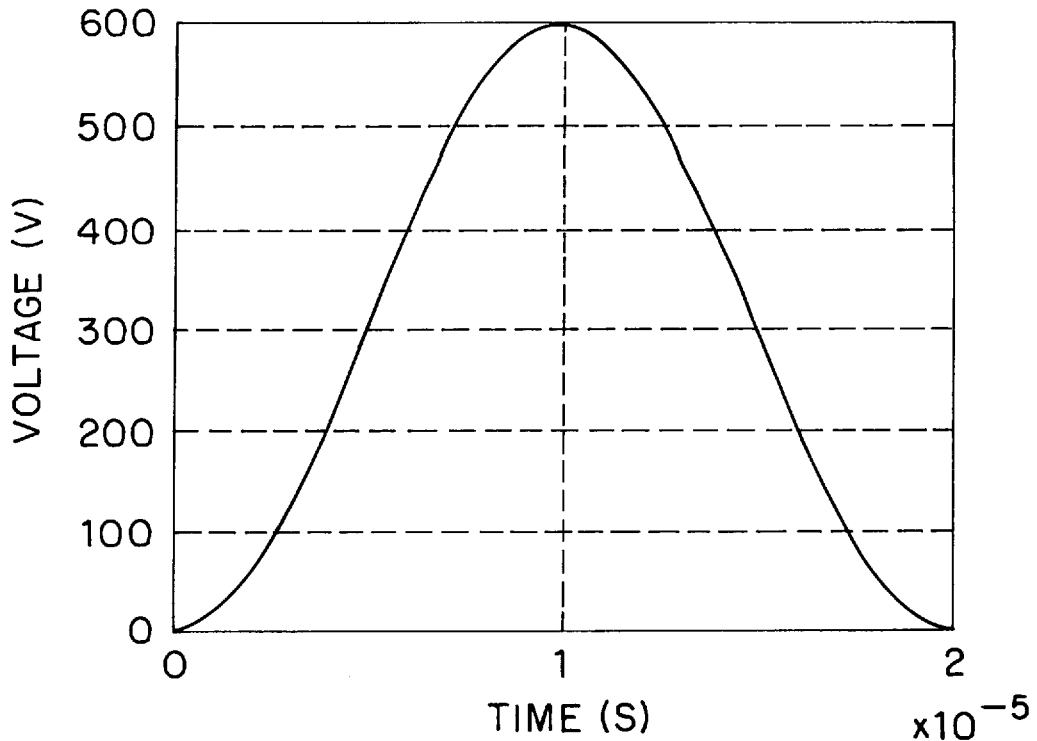
FIGS. 6a and 6b, respectively, are graphical representations showing the DC link voltage and inductor current for a standard resonant tank circuit.
Figure 6B:
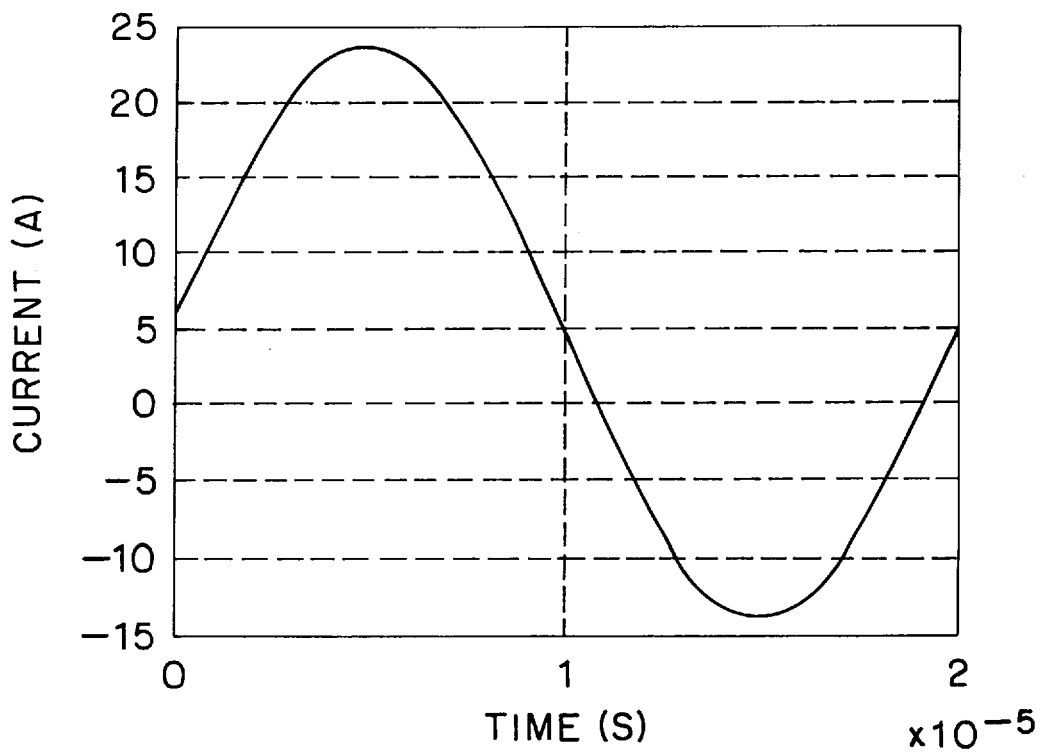

In the standard PRDCLI the load current does not affect the peak of the link voltage as long as the resonant tank is initialized to the proper value and the flow of power is to the load as described above. FIGS. 6a and 6b show the standard PRDCLI DC link voltage and the inductor current initialized ($I_O+I_L$=0.5+5.0=5.5A). Note that the peak DC link voltage does not change with load current.

Figure 7A:
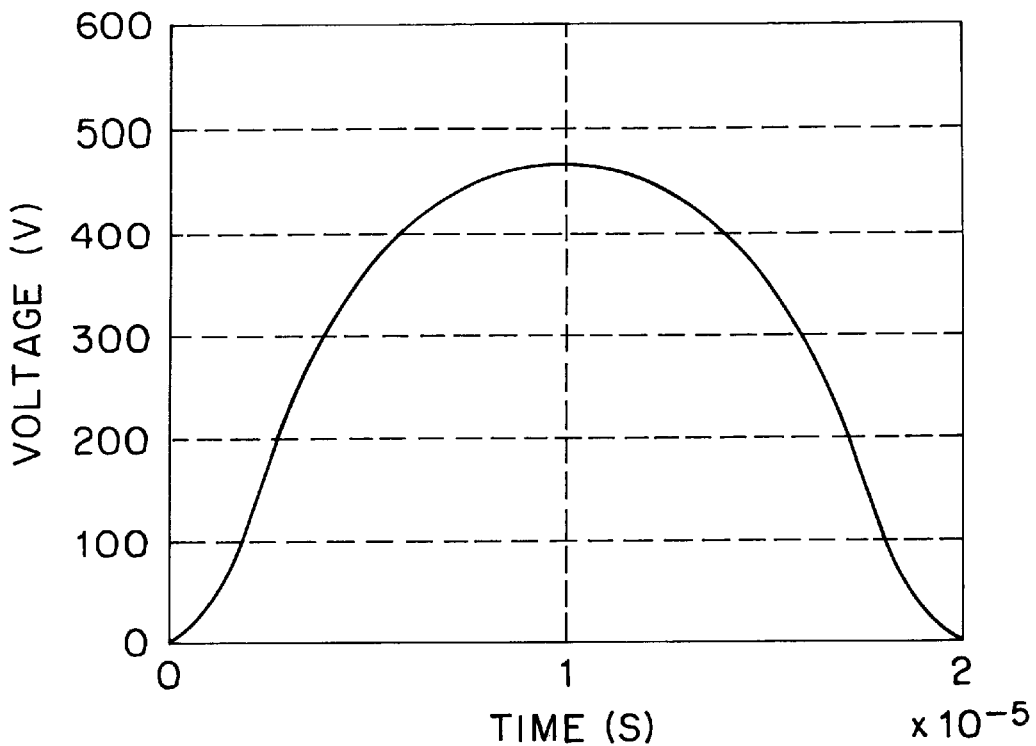
FIGS. 7a and 7b, respectively, are graphical representations showing the DC link voltage and inductor current versus time for a parallel resonant DC link inverter in accordance with the invention.
Figure 7B:
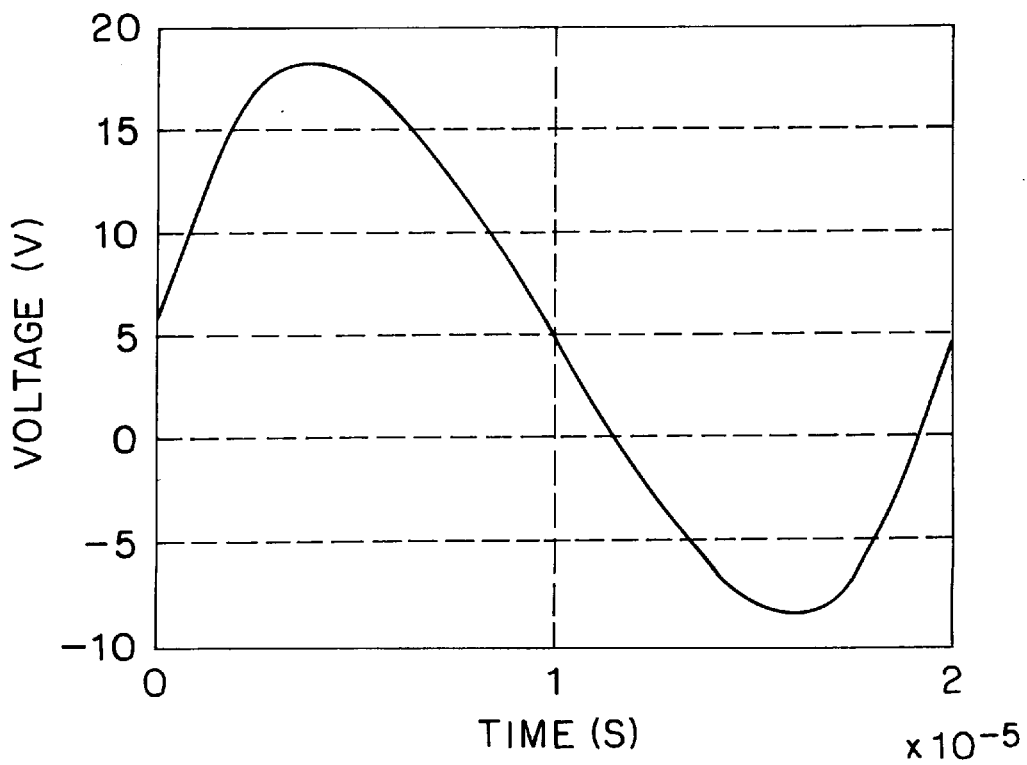

The peak link voltage of the resonant DC link inverter of the invention is not affected by load current so long as the resonant inductor is initialized to the proper value at the beginning of the resonant cycle. The initialization is performed in the same manner as the standard PRDCLI by simultaneously turning on two switches in the same leg of the inverter. This causes the inductor current to ramp up linearly with a slope of approximately $V_S/L_r$. Once the inductor current reaches ($I_O+I_L$) as defined earlier, the inverter switches are switched accordingly. FIGS. 7a and 7b show that the peak voltage of the new resonant DC link inverter does not change with load current.

The parallel resonant DC link inverter of the invention has the same advantages associated with the standard parallel resonant DC link inverter such as soft switching and reduced EMI. In addition to these advantages, the converter of the invention has a higher volt-second product per resonant voltage pulse and impose reduced voltage stresses on the power electronic switches. Moreover, the capacitance of the resonant capacitor is varied passively, requiring no additional circuitry as with the actively clamped parallel DC link inverter of FIG. 3.

Although the invention has been described herein with reference to the specific embodiments, many modifications and variations therein would readily occur to those skilled in the art. Accordingly, all such variations and modifications are included within the intended scope of the invention.

I claim:

1. A parallel resonant DC link inverter arrangement for converting DC voltage to an AC voltage comprising a DC voltage source, a plurality of semi-conductor switch elements for switching the DC voltage from the voltage source, and an LC tank circuit including a resonant capacitor having an antiferroelectric material as a dielectric.

2. A parallel resonant DC link inverter arrangement according to claim 1 in which the resonant capacitor has a capacitance that increases with increasing applied voltage.

3. A parallel resonant DC linked inverter arrangement according to claim 1 in which the antiferroelectric material is lead zirconium oxide.

4. A parallel resonant DC linked inverter arrangement according to claim 1 in which the peak voltage of the inverter does not change with load current.

5. A method for inverting a DC voltage comprising applying a DC voltage to a plurality of semiconductor switches by way of a tank circuit containing a nonlinear capacitor in which the capacitance increases with increasing applied voltage.

* * * * *